March 14, 1967  W. SHAW  3,308,625
GAS TURBINE BY-PASS ENGINE
Filed Sept. 18, 1964  4 Sheets-Sheet 2
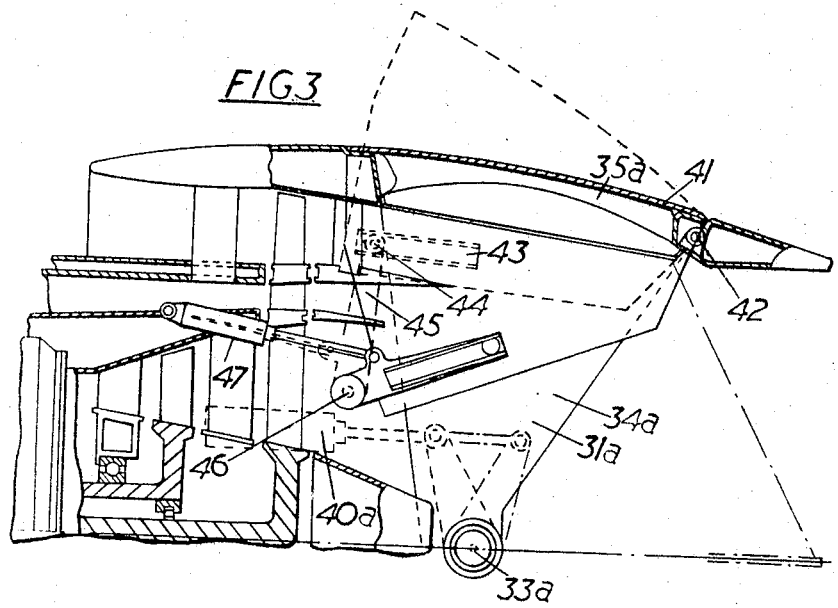
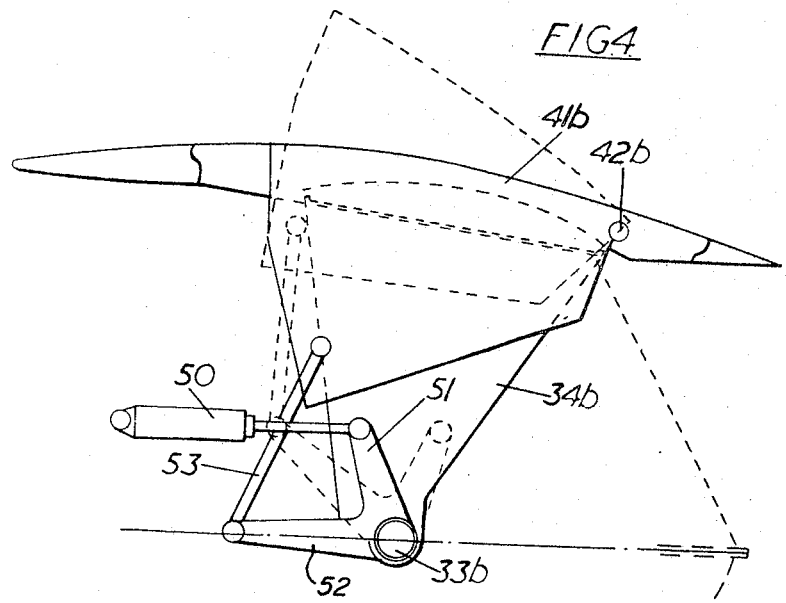
Inventor
WILLIAM SHAW
By
Cushman, Darby & Cushman
Attorneys

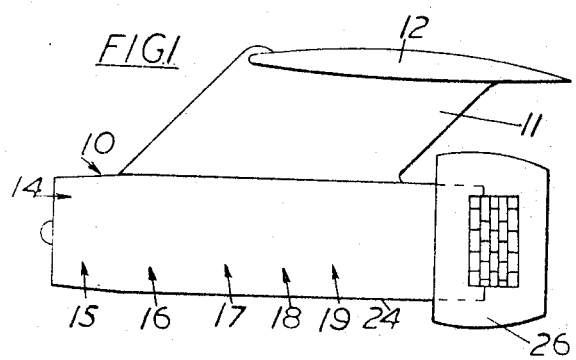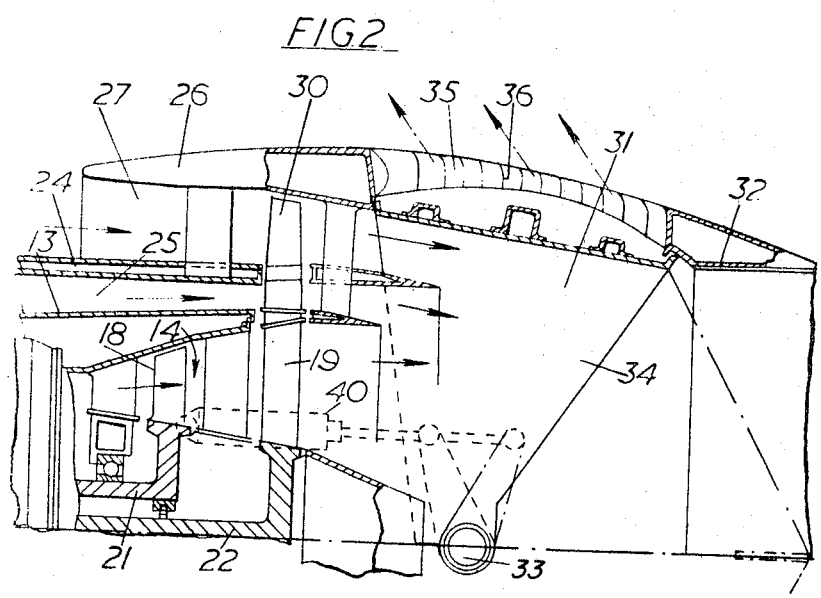

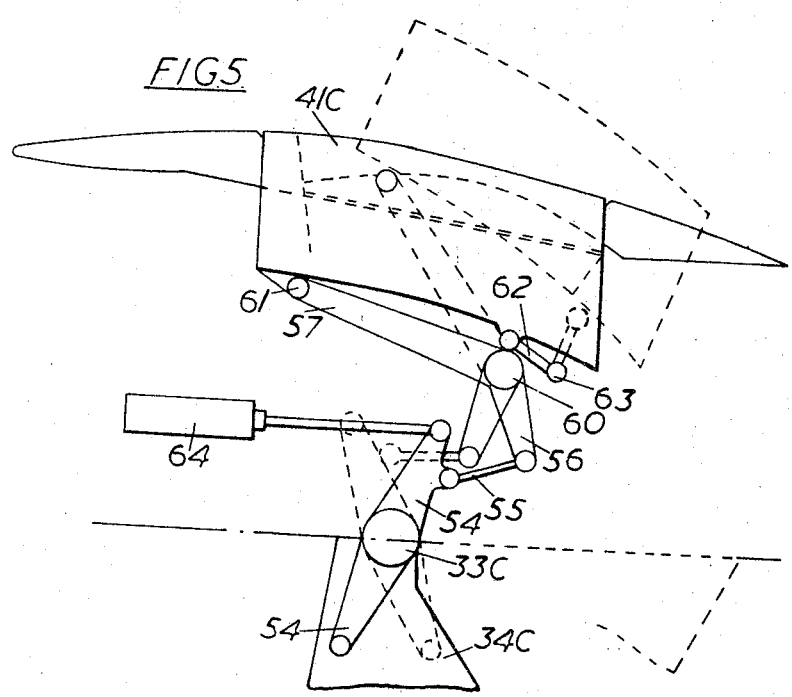
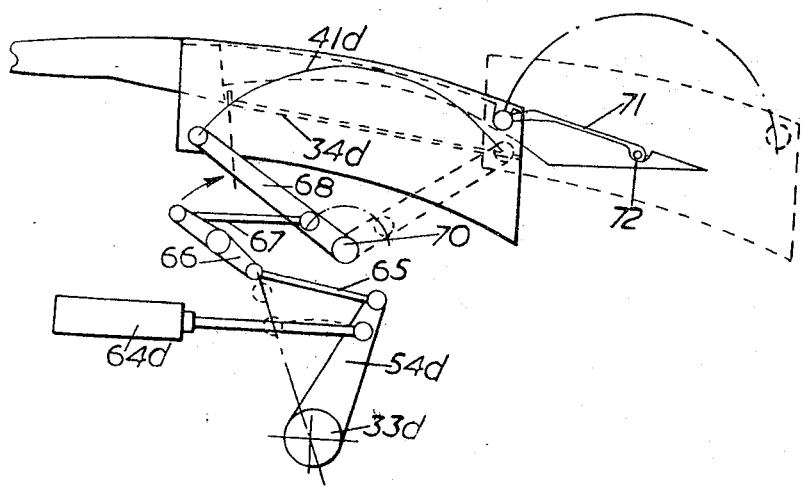

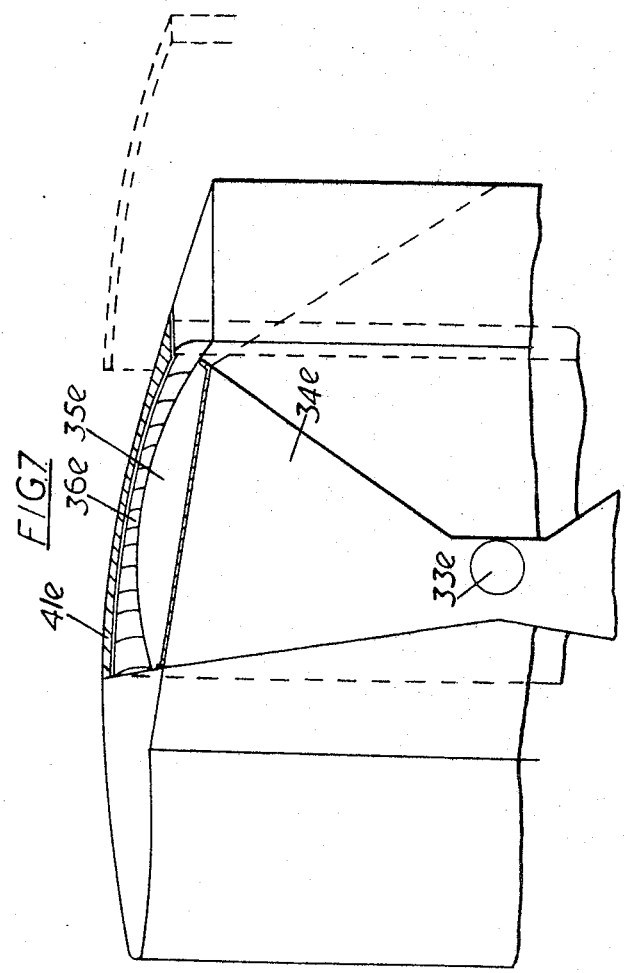

United States Patent Office 3,308,625
Patented Mar. 14, 1967

3,308,625
GAS TURBINE BY-PASS ENGINE
William Shaw, Alvaston, Derby, England, assignor to Rolls-Royce Limited, Derby, England, a company of Great Britain
Filed Sept. 18, 1964, Ser. No. 397,433
Claims priority, application Great Britain, Oct. 28, 1963, 42,502/63
8 Claims. (Cl. 60—229)

This invention concerns a gas turbine by-pass engine.

According to the present invention there is provided a gas turbine by-pass engine having an annular flow duct in which are arranged in flow series compressor means, combustion equipment, and turbine means, an annular by-pass duct which surrounds the said flow duct and the upstream end of which is arranged to receive by-pass air from the said compressor means, the by-pass duct by-passing the combustion equipment and turbine means, an annular fan duct which at least partly surrounds the by-pass duct and in which is mounted a fan, the same being structurally connected to and driven by the gas turbine means, and an exhaust duct whose downstream end is provided with a nozzle, the downstream ends of the flow duct, by-pass duct and fan duct all terminating substantially at the upstream end of the exhaust duct and communicating therewith, whereby the gases leaving all the said downstream ends flow through the same exhaust duct.

The fan is preferably a rear fan driven by the said turbine means.

The said exhaust duct is preferably provided with a thrust reverser or a thrust spoiler. Thus the exhaust duct may be provided with a thrust reverser which is arranged upstream of the nozzle.

The said thrust reverser may thus comprise a plurality of thrust reverser members which are movable between an inoperative position in which they permit the said gases to flow rearwardly through the said nozzle and an operative position in which they prevent the said gases from flowing rearwardly through the said nozzle and direct the said gases forwardly through openings in the exhaust duct, the said openings being maintained closed when the thrust reverser members are in their inoperative position, power means being provided for moving the thrust reverser members, between the said inoperative and operative positions as required. Forwardly facing deflector vanes may be mounted in the said openings to assist in directing the said gases forwardly.

The radially outermost parts of the said openings may be in permanent communication with the ambient air, the thrust reverser members closing the radially innermost parts of said openings when in their inoperative position, the said power means being constituted by at least one ram for moving the thrust reverser members.

Alternatively, at least one closure member may be provided which may be moved to open and close respectively the radially outermost parts of the said openings. The closure member or members may, if desired, be formed as gas deflectors, whereby to eliminate the above-mentioned deflector vanes.

The closure member may be an axially movable substantially cylindrical cowling member.

Alternatively, a plurality of closure doors may be provided which may be moved to open and close respectively the radially outermost parts of the said openings.

There may be a first ram which is arranged to move the thrust reverser members and a second ram which is arranged to move the closure doors.

Alternatively, there may be a single ram which is arranged to move both the thrust reverser members and the closure doors.

Each of the closure doors may be directly mounted adjacent its rear end on one or more fixed pivots.

Alternatively, each of the closure doors may be pivotally connected adjacent its rear end to one or more linkages, the or each said linkage being mounted on a fixed pivot.

Each said fixed pivot may be disposed rearwardly of its respective closure door when the latter is in its closed position, each closure door being moved radially and rearwardly when moving from the closed to the open position.

The invention is illustrated, merely by way of example, in the accompanying drawings, in which:

FIGURE 1 is a side elevation of a gas turbine by-pass engine, according to the present invention, carried by the wing of an aircraft, FIGURE 2 is a broken away cross sectional view of part of the engine shown in FIGURE 1, and FIGURES 3–7 illustrate respectively various modifications of the engine of FIGURES 1 and 2.

Referring first to FIGURES 1 and 2, a gas turbine by-pass engine 10 is carried by a strut 11 from a wing 12 of an aircraft.

The engine 10 has an engine casing 13 having an annular flow duct 14 therein. Within the annular flow duct 14 there are arranged in flow series a low pressure compressor 15, a high pressure compressor 16, combustion equipment 17, a high pressure turbine 18 and a low pressure turbine 19.

The high pressure compressor 16 and high pressure turbine 18 are mounted on a common shaft 21 within which is concentrically mounted a shaft 22 on which are mounted both the low pressure compressor 15 and the low pressure turbine 19.

Surrounding the engine casing 13 is a casing 24 which is spaced from the casing 13 so as to define therewith an annular by-pass duct 25.

The upstream end of the by-pass duct 25 communicates with the space (not shown) between the low pressure compressor 15 and the high pressure compressor 16 so as to receive some of the air which has been compressed by the low pressure compressor 15. The by-pass duct 25 by-passes the combustion equipment 17 and the turbines 18, 19.

Mounted concentrically about the downstream end of the casing 24 is a fan casing 26 which is spaced from the casing 24 so as to provide an annular fan duct 27 which is disposed adjacent the rear end of the engine 10. Mounted in the fan duct 27 are fan rotor blades 30 which are integral with and driven by the turbine blades of the low pressure turbine 19.

The downstream ends of the annular flow duct 14, the by-pass duct 25, and the fan duct 27 all communicate with a single common exhaust duct 31 whose downstream end is provided with a nozzle 32. Thus the gases leaving all the said downstream ends flow through the same exhaust duct.

Mounted on pivots 33 in the exhaust duct 31 are a pair of eyelid-type thrust reverser members 34, the thrust reverser members 34 being disposed upstream of the nozzle 32.

The thrust reverser members 34 may be disposed in an operative position, indicated by chain dotted lines in FIGURE 2, in which they prevent the gases from the ducts 14, 25, 27, from flowing rearwardly through the nozzle 32. When the thrust reverser members 34 are in their operative position, they direct the said gases forwardly through openings 35 in the wall of the exhaust duct 31, forwardly facing deflector vanes 36 being mounted in the openings 35 to assist in directing the said gases forwardly. Thus, in the operative position, the thrust reverser members 34 effect thrust reversal.

The thrust reverser members 34 may also, however, be disposed in an inoperative (or full line) position in which they permit the gases from the ducts 14, 25, 27 to flow rearwardly through the nozzle 32 whereby to provide forward propulsion. The radially outermost parts of the openings 35 are in permanent communication with the ambient air, but the thrust reverser members 34, when in their inoperative position, effect closure of the radially innermost ports of the openings 35.

Movement of the thrust reverser members 34 between their operative and inoperative positions is effected by a pair of rams 40 each of which is arranged to effect rotation through a small angle of a respective pivot 33.

In FIGURE 3 there is shown a gas turbine by-pass engine which is generally similar to that shown in FIGURE 2 and which for this reason will not be described in detail, similar parts being given the same reference numerals with the addition of the suffix a.

In the FIGURE 3 construction, a pair of eyelid-type thrust reverser members 34a are mounted on pivots 33a and are moved between their operative and inoperative positions by rams 40a.

The wall of the exhaust duct 31a is provided with openings 35a, but the radialy outermost parts of the openings 35a are not in permanent communication with the ambient air. Instead, closure doors 41 are provided which may be moved to open and close respectively the said radially outermost parts of the openings 35a.

Each of the closure doors 41 is directly mounted adjacent its rear end on a pair of fixed pivots 42. Each of the closure doors 41 is also provided adjacent its forward end with a pair of diametrically oppositely disposed slots 43 which act as tracks for rollers 44. The rollers 44 are respectively carried by levers 45, the latter being pivoted at 46. Each lever 45 may be moved about its pivot 46 by a ram 47. The ram 47 may thus move the respective closure door 41 between the closed position shown in full lines in FIGURE 3, in which it prevents the gases from passing through the radially outermost parts of the openings 35a, and an open position, indicated by dotted lines in FIGURE 3, in which it permits flow through the said radially outermost parts.

In FIGURE 4 there is shown a thrust reverser for the gas turbine by-pass engine of the present invention. The thrust reverser of FIGURE 4 is generally similar to that of FIGURE 3, except that rams 50 are provided which are arranged to move both the thrust reverser members 34b and the closure doors 41b.

Each of the rams 50 is connected to an arm 51 of a bell crank lever 51, 52, the bell crank lever 51, 52, being mounted on one of the pivots 33b so as to be adapted to effect rotation of the latter. Thus, movements of the rams 50 effect movement of the thrust reverser members 34b between their operative and inoperative positions.

Each of the levers 52 is pivotally connected to one end of a link 53 whose other end is pivotally connected to the respective closure door 41b adjacent the forward end thereof. Thus movements of the levers 52 by the rams 50 effect pivotal movement of the doors 41b about their pivots 42b so as to move them from the closed to the open position.

In FIGURE 5 there is shown yet another thrust reverser for the gas turbine by-pass engine of the present invention. In the FIGURE 5 construction, the pivots 33c of the thrust reverser members 34c are fixedly secured to a lever having two diametrically oppositely disposed arms 54. Each of the arms 54 is connected by a link 55 to a lever 56 of a bell crank lever 56, 57. The bell crank lever 56, 57 is itself mounted on a pivot 60, the lever 57 being connected to the respective closure door 41c at a pivot 61 which is disposed adjacent the forward end of the closure door. Each of the closure doors 41c is pivotally connected adjacent its rear end to linkages 62 which are themselves mounted on fixed pivots 63.

The levers 54 are arranged to be moved by rams 64 and it will thus be appreciated that the same rams 64 effect movement of the thrust reverser members 34c between their operative and inoperative positions and also effect pivotal movement of the closure doors 41c between their open and closed positions.

In the FIGURE 6 construction, which is generally similar to the FIGURE 5 construction, rams 64d are employed which are arranged to effect pivotal movement of levers 54d, the latter being arranged to effect rotation of the pivots 33d. Movement of the rams 64d thus effects movement of the thrust reverser members 34d between their operative and inoperative positions.

Each of the levers 54d is connected by a link 65 to one end of a lever 66 whose other end is connected by a link 67 to a lever 68. One end of the lever 68 is mounted on a fixed pivot 70, whilst the other end of the lever 68 is pivotally connected to a forward portion of the respective closure door 41d.

Each of the closure doors 41d is pivotally connected adjacent its rear end to a link 71 mounted on a fixed pivot 72, the fixed pivot 72 being disposed rearwardly of the respective closure door 41d when the latter is in its closed position.

Accordingly, as indicated by dotted lines in FIGURE 6, the closure doors 41d in moving from their closed to their open position, first move radially outwardly and rearwardly and thereafter move radially inwardly and rearwardly.

In FIGURE 7 there is shown a thrust reverser for a gas turbine by-pass engine according to the present invention, the thrust reverser having thrust reverser members 34e which may be moved by rams (not shown) into and out of an inoperative position in which they block openings 35e, deflector vanes 36e being mounted in the openings 35e. An axially movable substantially cylindrical cowling member 41e is provided with rollers (not shown) which are movable in a plurality of axially extending fixed tracks (not shown). The cowling member 41e is movable fore and aft by rams (not shown) into and out of a position in which it closes the radially outermost ends of the openings 35e.

I claim:
1. A gas turbine by-pass engine comprising: a casing defining a flow duct; compressor means, combustion equipment, and turbine means arranged in flow series in said flow duct; a second casing surrounding said first casing and defining therewith an annular by-pass duct, said by-pass duct having an upstream end which received by-pass air from said compressor means and said by-pass duct by-passing said combustion equipment and turbine means; an outer casing at least partly surrounding said second casing and defining therewith an annular fan duct; a fan mounted in said fan duct, said fan having a structural connection to and being driven by said turbine means; and an exhaust duct having a nozzle mounted at its downstream end, the downstream ends of said flow duct, by-pass duct and fan duct all terminating substantially at and all communicating with the upstream end of said exhaust duct whereby the gases leaving all of the downstream ends of said flow duct, by-pass duct and fan duct substantially simultaneoously mix and flow through said exhaust duct.

2. A gas turbine by-pass engine as claimed in claim 1 wherein said fan is carried by and is integrally connected to said turbine means.

3. A gas turbine by-pass engine as claimed in claim 1 wherein there are provided sets of substantially radially extending supporting struts between the outer casing of said fan duct and the casings of said annular flow and by-pass ducts respectively.

4. A gas turbine by-pass engine as claimed in claim 1 wherein the exhaust duct has openings therein, forwardly facing deflector vanes mounted in said openings to assist in directing the said gases forwardly; a plurality of thrust reverser members which are mounted in the exhaust duct and which are movable between an inoperative position in which they permit the said gases to flow rearwardly through the said nozzle and an operative position in which they prevent the said gases from flowing rearwardly through the said nozzle and direct the said gases forwardly through the openings in the exhaust duct, the said openings being maintained closed when the thrust reverser members are in their inoperative position, and power means for moving the thrust reverser members between the said inoperative and operative positions as required.

5. A gas turbine by-pass engine as claimed in claim 4 in which the radially outermost parts of the said openings are in permanent communication with the ambient air, the thrust reverser members closing the radially innermost parts of said openings when in their inoperative position.

6. A gas turbine by-pass engine as claimed in claim 4 wherein there is provided at least one closure member which may be moved to open and close respectively the radially outermost parts of the said openings.

7. A gas turbine by-pass engine as claimed in claim 6 wherein there is at least one ram to move said thrust reverser members and said at least one closure member.

8. A gas turbine by-pass engine as claimed in claim 7 wherein said at least one closure member is pivotally connected to a fixed pivot.

References Cited by the Examiner

UNITED STATES PATENTS

| | | | |
|---|---|---|---|
| 2,509,890 | 5/1950 | Stalker | 230—122 |
| 2,692,724 | 10/1954 | McLeod. | |
| 3,034,296 | 5/1962 | Keen et al. | 60—35.54 |
| 3,036,431 | 5/1962 | Vdolek. | |
| 3,050,937 | 8/1962 | James et al. | 60—35.54 |
| 3,068,646 | 12/1962 | Fletcher. | |
| 3,182,898 | 5/1965 | Hewson. | |

CARLTON R. CROYLE, *Primary Examiner.*